United States Patent [19]

Yanagisawa et al.

[11] Patent Number: 5,210,141

[45] Date of Patent: May 11, 1993

[54] DELUSTERED THERMALLY SHRINKABLE FILM

[75] Inventors: Takeji Yanagisawa, Kashima; Yasutoshi Soda, Okegawa, both of Japan

[73] Assignee: Shin-Etsu Chemical Co., Ltd., Tokyo, Japan

[21] Appl. No.: 836,551

[22] Filed: Feb. 18, 1992

Related U.S. Application Data

[63] Continuation-in-part of Ser. No. 566,924, Aug. 14, 1990, abandoned.

[30] Foreign Application Priority Data

Aug. 15, 1989 [JP] Japan .................................. 1-210401

[51] Int. Cl.$^5$ ..................... C08L 27/02; C08L 27/04; C08L 27/06
[52] U.S. Cl. ..................................... 525/239; 525/198
[58] Field of Search ................................. 525/239, 198

[56] References Cited

U.S. PATENT DOCUMENTS

| | | | |
|---|---|---|---|
| 3,723,576 | 3/1973 | Maclaine et al. | 525/239 |
| 4,267,084 | 5/1981 | Mizutani et al. | 525/239 |
| 4,567,217 | 1/1986 | Yamazaki et al. | 525/225 |
| 4,636,547 | 1/1987 | Engelmann et al. | 525/239 |
| 4,775,699 | 10/1988 | Cozens | 521/56 |

*Primary Examiner*—James J. Seidleck
*Assistant Examiner*—W. R. M. Clark
*Attorney, Agent, or Firm*—Millen, White, Zelano & Branigan

[57] ABSTRACT

Disclosed in a delustered, thermally shrinkable polyvinyl chloride film which is obtained by extruding and orienting a polyvinyl chloride resin composition in which the polyvinyl chloride is a mixture of (A) a partially crosslinked polyvinyl chloride resin and (B) a non-crosslinked polyvinyl chloride resin in an (A)/(B) weight ratio of from 15/85 to 80/20; and in which the average polymerization degree of tetrahydrofuran-soluble portion of the polyvinyl chloride resin (B) is greater than that of tetrahydrofuran-soluble portion of the polyvinyl chloride resin (A).

13 Claims, No Drawings

DELUSTERED THERMALLY SHRINKABLE FILM

This application is a continuation-in-part of application Ser. No. 07/566,924, filed Aug. 14, 1990, now abandoned.

TECHNICAL FIELD

The present invention relates to a delustered, thermally shrinkable film, more particularly to a delustered thermally shrinkable film of vinyl chloride resin useful for making labels for various types of containers, cap seals, shrink fit wrappers for packaging products of diverse shapes, including multiple units thereof, such as cassette tape cases.

The oriented thermally shrinkable films and tubes (hereinafter referred to collectively as "film(s)") which are made of vinyl chloride resin are widely used as the materials to make tight wrappers for a wide variety of articles from foods to machine parts, as well as labels, cap seals, etc., because they are superior to the films made of other resins with respect to properties such as transparency, glossiness, chemical resistance, water resistance, and printability, and also because they can be easily sealed with a solvent.

PRIOR ART

A market demand has recently arisen for improving the appearance of quality products so as to give a quality appearance thereto and thereby distinguish them from ordinary products of the same kind and thus it was hoped that a delustered thermally shrinkable film would be developed. Conventional methods developed prior to the present invention for delustering the surface of thermally shrinkable film include:

(1) sand blasting or sand matting;
(2) adding thereto inorganic filler having a mean particle diameter of 1.0–4.0 μm and the maximum particle diameter of 10 μm or smaller;
(3) applying an emboss roll to the film as it is extruded or calendered before being oriented by being tentered in one or both directions.

Method (1) delusters the film by physically imparting surface flaws threrto, so that the physical characteristics of the film itself may be degraded. Also, the inclusion of a blasting step in the manufacture line results in an increased manufacturing cost. In order to attain a sufficient delustering effect by Method (2), a considerable amount of inorganic filler is required, and, as a result, the thus delustered film is susceptible to cuts during the printing and processing such as tubing, and pinholes (resulting in print dropout) during the printing; what is more, the transparency of the film is reduced by the filler so much that back-printed pattern will not show clearly. In Method (3), because a film sheet embossed by a matte-finish squeezing roller is later tentered (oriented), it is difficult to obtain a delustered film having a matted surface of extra fine texture. Also, in the cases where it is required that the degree of the delustering of the thermally shrinkable film is varied depending on the end use applications, a plurality of emboss rolls must be available to provide for each requirement, which increases the cost of the production facilities.

To overcome these deficiencies, Japanese Patent Kokai No. 61-118226 disclosed a delustered thermally shrinkable film which is manufactured by extruding and orienting a resin of a composition consisting mainly of partially crosslinked polyvinyl chloride. However, this composition exhibits poor extrusion characteristics, it is not suited for a long run operation, and its maximum orientation ratio is only 2.2 so that the thermal shrinkage factor at 100° C. cannot be 50% or higher. Consequently, the end use application for the composition is quite limited. Incidentally, throughout this specification, it should be understood that "orientation" means stretching (tentering) something in a predetermined direction(s).

It is, therefore, an object of the invention to provide a delustered, thermally shrinkable film which can be physically treated with mechanical means, to which a material having properties foreign to the film can be added without the film losing its inherent film characteristics, and which can be manufactured without increasing installation cost or imposing a limitation to conventional physical processing operations.

SUMMARY OF THE INVENTION

In one aspect, the present invention relates to a delustered, thermally shrinkable film made of a mixture of (A) a partially crosslinked polyvinyl chloride resin and (B) a non-crosslinked polyvinyl chloride resin, in an (A):(B) weight ratio of from 15:85 to 80:20.

DETAILED DESCRIPTION OF THE INVENTION

The films of this is obtained by extruding and orienting a polyvinyl chloride resin of composition in which the resin is a physical mixture of Component (A) and Component (B), in the aforesaid weight ratio.

Component (A), namely, a partially crosslinked polyvinyl chloride resin (A), can, for example, be resins such as are obtained according to the disclosures of Japanese Patent Publication (Kokoku) No. 62-15564 and Japanese Patent Provisional Publication (Kokai) No. 54-134793, whose disclosures are incorporated herein by reference. These resins are produced by conducting a suspension polymerization of vinyl chloride monomer, or a mixture of vinyl chloride monomer and a smaller amount of another vinyl monomer(s), in the presence of a multifunctional monomer in an amount to give a desired degree of bridge formation (crosslinking).

The multifunctional monomer has at least two ethylenic double bonds in the molecule. Examples are diallyl esters of phthalic acids, such as diallyl phthalate; diallyl esters of ethylenically unsaturated dibasic acids, such as diallyl maleate, diallyl fumarate, and diallyl iotaconate; divinyl ethers, such as diallyl ether, triallyl cyanurate, ethyleneglycoldivinyl ether, and n-butanedioldivinyl ether; diacrylic or dimethacrylic esters of polyatomic alcohols, such as ethyleneglycoldiacrylate, ethyleneglycoldimethacrylate, polyethyleneglycoldiacrylate, and polyethyleneglycoldimethacrylate.

In order to obtain a thermally shrinkable film having excellent surface delustering property, it is preferred to employ 0.01 to 10 weight parts of the polyfunctional monomer per 100 weight parts of vinyl chloride monomer or of the mixture of vinyl chloride monomer and a smaller amount of other vinyl monomer(s).

Examples of the optional other vinyl monomer which can be copolymerized with the vinyl chloride are vinyl esters, such as vinyl acetate and vinyl propionate; acrylic esters, such as methyl acrylate and ethyl acrylate; methacrylic esters, such as methyl methacrylate and ethyl methacrylate; aliphatic olefins, such as ethylene and propylene; maleic anhydride; acrylonitrile;

aromatic olefins, such as styrene; and vinylidene chloride.

The partially crosslinked polyvinyl chloride resin which is used as Component (A) in the above described procedure, preferably contains about 5-50 weight %, preferably 10-35 weight %, and most preferably 15-25 weight % a gel which is insoluble in tetrahydrofuran. If the gel content of the partially crosslinked polyvinyl chloride resin is less than 5 weight %, the delustering effect will be poor, and if it exceeds 50 weight %, it becomes difficult to process the resulting film, and also a considerable number of fish eyes (polka dot burns) are formed when the film is oriented, which results in the formation of pinholes during printing on the film.

The average degree of polymerization of the portion of Component (A) that is soluble in tetrahydrofuran is preferably 400-1000, more preferably 500-800. If it is less than 400, the physical properties of the resulting thermally shrinkable film will be poor and when the film is subjected to subsequent processing such as printing, slitting, and tubing, the film is liable to cut; and when it is greater than 1000, the extrusion characteristics and orientation characteristics such as maximum orientation ratio of the film will be extremely poor.

The non-crosslinked polyvinyl chloride resin used as the Component (B) in the above described procedure is completely soluble in tetrahydrofuran. It is a conventional linear polymer which can be obtained through such common methods as suspension polymerization of the monomer.

Examples of the Component (B) include homopolymers of vinyl chloride and copolymers thereof produced from vinyl chloride monomer and a smaller amount of another monomer which can undergo copolymerization with vinyl chloride monomer.

Examples of such other monomers that can form copolymers with vinyl chloride monomer are vinyl esters, such as vinyl acetate and vinyl propionate; acrylic esters, such as methyl acrylate and ethyl acrylate; methacrylic esters, such as methyl methacrylate and ethyl methacrylate; aliphatic olefins, such as ethylene and propylene; maleic anhydride; acrylonitrile; aromatic olefins, such as styrene; and vinylidene chloride.

The average degree of polymerization of the non-crosslinked vinyl chloride resin should be 600-1100, or preferably 700-900. If this is smaller than 600, the properties of the resulting thermally shrinkable film will be so degraded that when the film is processed, it is susceptible to being cut; and when greater than 1100, the extrusion and tentering characteristics of the film will be extremely poor.

The principal starting material for the delustered, thermally shrinkable film according to this invention, is a polyvinyl chloride resin which is a mixture of a partially crosslinked polyvinyl chloride resin (A) and a non-crosslinked polyvinyl chloride resin (B), in an (A):(B) weight ratio of from 15:85 to 80:20, preferably, from 30:70 to 60:40. If the weight ratio is less than 15:85, the delustering effect will be insufficient and the uniformity in the surface roughness will be low. Conversely, if it is over 80:20, the extrusion characteristics will be poor and the maximum orientation ratio cannot be increased to a desirable level.

Preferably, the polyvinyl chloride resin employed as the starting material contains THF-insoluble gel in an amount of 3-18 weight %, or more preferably 7-15 weight %, based on the total weight of the Components (A) and (B). If the gel content is less than 3 weight %, the delustering effect will be poor, and if it is over 18 weight %, a considerable number of fish eyes are formed when the film is oriented, which results in the formation of pinholes during printing on the film.

In order to attain that the surface roughness of the resulting thermally shrinkable film has a high uniformity such that printing on the film is devoid of nonuniformity, the relationship of the average polymerization degree (A.P.D.) of the THF-soluble portion (non-gel portion) of the polyvinyl chloride resin (A) to the THF-soluble portion of the polyvinyl chloride resin (B) must be the following:

$$[\text{A.P.D. of (B)}] - [\text{A.P.D. of (A)}] \geq 0,$$

more preferably, $$[\text{A.P.D. of (B)}] - [\text{A.P.D. of (A)}] \geq 100,$$

still more preferably, $$[\text{A.P.D. of (B)}] - [\text{A.P.D. of (A)}] \geq 200.$$

Optionally, the starting polyvinyl chloride resin composition can contain a plasticizer such as DOA, DOP and TPP, in an amount of up to 20 weight parts per 100 parts of the resin composition. If more than 20 weight parts of such a plasticizer is present, the thermally shrinkable film produced therefrom will be so softened that when it is used as a label, to apply it to containers such as bottles will be difficult, and thus the production efficiency in the packaging line would be lowered.

The starting resin composition can also contain the following other optional additives without destroying the effects of the invention: an impact modifier such as MBS, EVA, and ABS; a processing aid such as MMA; a Sn-containing stabilizer such as di-n-butyltin maleate ester, dioctyltin maleate polymer, and dioctyltinmercaptide; a metallic soap stabilizer such as Ca-Zn containing soap; a lubricant such as butyl stearate, monostearyl glyceride, ethylenebisamide, and polyethylene waxes; a ultraviolet absorber; a coloring agent; and an antistatic agent.

The thus prepared resin composition is shaped into a film, conventionally in a known manner such as extrusion and calendering, and the film is oriented by means of mono-axial orientation or bi-axial orientation in a manner such that the orientation ratio in at least one of the directions is 2.3-4.0. As a result, a delustered, thermally shrinkable film of the invention is obtained which has a thermal shrinkage factor of 50 to 65% at 100° C.

The invention now will be explained with reference to examples and comparative examples. However, it should be understood that the phraseology or terminology employed herein is for the purpose of description and not of limitation of the invention.

The scope of the invention, therefore, is to be determined solely by the claims.

EXAMPLES

Eight mixtures of the components described below (Examples 1-8 shown in the Table below) were prepared by means of a high-speed mixer and then were heated to 140° C. and cooled to obtain the respective starting polyvinyl chloride resin compositions.

Components

1. Partially-crosslinked polyvinyl chloride resin as Component (A)

GR-800S: manufactured by Shin-Etsu Chemical Co., Ltd.
  gel content: 20.0%
  average degree of polymerization of THF-soluble portion: 780

GR-600S: manufactured by Shin-Etsu Chemical Co., Ltd.
  gel content: 21.0%
  average degree of polymerization of THF-soluble portion: 580

2. Non-crosslinked polyvinyl chloride resin as Component (B)

TK800: manufactured by Shin-Etsu Chemical Co., Ltd.
  gel content: 0%
  average degree of polymerization of THF-soluble portion: 800

3. Impact modifier

Kane Ace B-22: manufactured by Kanegafuchi Chemical Industry Co., Ltd.
  MBS resin 4. Processing aid PA-20: manufactured by Kanegafuchi Chemical Industry Co., Ltd.
  MMA resin 5. Stabilizer TS-209S: manufactured by Akishima Chemical Co., Ltd.
  organic, tin-containing stabilizer 6. Lubricant Kalcohl 86: manufactured by Kao Corporation
Alflow H-100S: manufactured by Nippon Oil and Fats Co., Ltd.

Extrusion Characteristics

With respect to each of the eight compounds, a T-die sheet having a thickness of 0.2 mm and a width of 500 mm was extruded by a 50 mm $\phi$ single extruder under the following conditions:

| | |
|---|---|
| cylinder temperature $C_1$: | 145° C. |
| cylinder temperature $C_2$: | 175° C. |
| adaptor temperature A: | 150° C. |
| die temperature D: | 190° C. |
| screw compression ratio CR: | 3.0 |
| screw compression ratio L/D: | 22 |
| screw rotational speed: | 20 rpm. |

During the extrusion operation, the motor load current and the extruder output were measured, and a long run suitability was rated to thereby evaluate the extrusion characteristics of each of the eight compositions.

The rating of the long run suitability was determined such that when the time length before spotty burns (yellow to red brown) occur is 12 hours or shorter, the rating if NG; when it is 12-24 hours, the rating is OK; and when it is 24 hours or longer, the rating is EXCELLENT.

Evaluation of Orientation Characteristics

Each T-die sheet (0.2 mm by 500 mm) obtained in the above extrusion was oriented, aiming at an orientation ratio of 2.5, by means of a small-sized orientation machine under the conditions that the preheat temperature was 100° C., the orientation temperature was 90° C., the thermal fixture temperature was 90° C., and the line speed was 15 m per minute.

The resulting thermally shrinkable films were each evaluated by inspecting whether or not the orientation ratio of 2.5 was achieved (Yes, No).

Evaluation of the Thermally Shrinkable Films

In order to evaluate the film quality of each one of the thermally shrinkable films obtained in the above orientation operation (film No. 1 was oriented only to 2.2 times), inspections were conducted to rate film haziness, surface delustering degree, uniformity in the delustered surface roughness, and shrinkage factor according as the rating standards described below, and also, after the thermally shrinkable film was extruded and tentered, a gold color roto-gravure ink was applied all over the cooled surface of the film in a manner such that the thickness of the ink layer was about 1 to 2 $\mu$m so as to inspect the appearance of the delustered surface and count the number of pin holes per square meter ($N/m^2$):

1. Film haziness:

Measured by a turbidity measuring instrument manufactured by NEC Corporation, in accordance with a method conforming to JIS K-7105.

2. Surface delustering degree

Excellent: Delustered to the extent that the surface has the classic image
OK: Delustered
NG: The surface has luster more or less
BS: The surface has luster all over 3. Uniformity in the delustered surface roughness Excellent: Surface roughness is finely grained and uniform
OK: Surface roughness is uniform
NG: Surface roughness is not uniform and is uneven
BS: Surface is without roughness 4. Appearance of delustered surface Excellent: Print ink is applied uniformly without blurs
OK: Print ink is applied uniformly but with a few blurs
NG: Print ink is blurred all over

TABLE

| EXPERIMENT (EXAMPLE) No. | | 1 | 2 | 3 | 4 |
|---|---|---|---|---|---|
| COMPOSITION (WEIGHT %) | | | | | |
| (A) COMPONENT RESIN | GR-800S (gel: 20%) | 100 | 80 | 60 | 40 |
| | GR-600S (gel: 21%) | — | — | — | — |
| (B) COMPONENT RESIN | TK-800 (gel: 0%) | — | 20 | 40 | 60 |
| IMPACT MODIFIER | KANE ACE B-22 | 8 | 8 | 8 | 8 |
| PROCESSING AID | PA-20 | 2 | 2 | 2 | 2 |
| STABILIZER | TS-209S | 3 | 3 | 3 | 3 |
| LUBRICANT | KALCOHL 86 | 0.8 | 0.8 | 0.8 | 0.8 |

TABLE-continued

| | | Exp 1 | Exp 2 | Exp 3 | Exp 4 |
|---|---|---|---|---|---|
| | ALFLOW H-100S | 0.15 | 0.15 | 0.15 | 0.15 |
| RESULTS OF THE EXPERIMENTS | | | | | |
| EXTRUSION CHARACTERISTICS | MOTOR LOAD CURRENT | 34 | 31.5 | 30.5 | 29.8 |
| | EXTRUDER OUTPUT (kg/hr) | 8.0 | 8.8 | 10.0 | 10.4 |
| | LONG RUN STABILITY | NG | OK | EXCELLENT | EXCELLENT |
| ORIENTATION | 2.5-ORIENTATION RATIO ACHIEVED? | NO† | YES | YES | YES |
| PROPERTIES OF THERMALLY SHRINKABLE FILM | HAZINESS (HAZE %) | 76† | 73 | 72 | 64 |
| | SURFACE DELUSTERING DEGREE | EXCELLENT‡ | EXCELLENT | EXCELLENT | EXCELLENT |
| | DELUSTERED SURFACE ROUGHNESS UNIFORMITY | OK‡ | OK | OK | OK |
| | SHRINKAGE LATERAL % | 47† | 54 | 55 | 55 |
| | FACTOR LONGITUDINAL % | 4‡ | 3 | 4 | 5 |
| (PRINTABILITY) | APPEARANCE OF DELUSTERED SURFACE | OK‡ | OK | OK | OK |
| | NO. OF PIN HOLES/m² | 30‡ | 15 | 10 | 7 |

| | EXPERIMENT (EXAMPLE) No. | 5 | 6 | 7 | 8 |
|---|---|---|---|---|---|
| COMPOSITION (WEIGHT %) | | | | | |
| (A) COMPONENT RESIN | GR-800S (gel: 20%) | 20 | — | — | — |
| | GR-600S (gel: 21%) | — | — | 60 | 40 |
| (B) COMPONENT RESIN | TK-800 (gel: 0%) | 80 | 100 | 40 | 60 |
| IMPACT MODIFIER | KANE ACE B-22 | 8 | 8 | 8 | 8 |
| PROCESSING AID | PA-20 | 2 | 2 | 2 | 2 |
| STABILIZER | TS-209S | 3 | 3 | 3 | 3 |
| LUBRICANT | KALCOHL 86 | 0.8 | 0.8 | 0.8 | 0.8 |
| | ALFLOW H-100S | 0.15 | 0.15 | 0.15 | 0.15 |
| RESULTS OF THE EXPERIMENTS | | | | | |
| EXTRUSION CHARACTERISTICS | MOTOR LOAD CURRENT | 29.3 | 29.0 | 29.7 | 29.5 |
| | EXTRUDER OUTPUT (kg/hr) | 10.6 | 11.0 | 10.4 | 10.6 |
| | LONG RUN STABILITY | EXCELLENT | EXCELLENT | EXCELLENT | EXCELLENT |
| ORIENTATION | 2.5-ORIENTATION RATIO ACHIEVED? | YES | YES | YES | YES |
| PROPERTIES OF THERMALLY SHRINKABLE FILM | HAZINESS (HAZE %) | 48 | 20 | 70 | 61 |
| | SURFACE DELUSTERING DEGREE | OK | BS | EXCELLENT | EXCELLENT |
| | DELUSTERED SURFACE ROUGHNESS UNIFORMITY | NG | — | EXCELLENT | EXCELLENT |
| | SHRINKAGE LATERAL % | 56 | 56 | 55 | 56 |
| | FACTOR LONGITUDINAL % | 4 | 5 | 4 | 4 |
| (PRINTABILITY) | APPEARANCE OF DELUSTERED SURFACE | NG | — | EXCELLENT | EXCELLENT |
| | NO. OF PIN HOLES/m² | 8 | — | 1 | 0 |

†: Maximum orientation ratio was 2.2.
‡: Measured and evaluated on 2.2 - time orientation film.

What is claimed is:

1. A delustered, thermally shrinkable film made from a mixture of (A) a partially crosslinked polyvinyl chloride resin having a tetrahydrofuran-insoluble gel content of 10-35 wt. %, (B) a non-crosslinked polyvinyl chloride resin, and (C) 0 to 20 parts by weight of a plasticizer per 100 parts by weight of (A) plus (B), said mixture being mixed in an (A):(B) weight ratio of from 30:70 to 60:40, in which the average polymerization degree of tetrahydrofuran-soluble portion of the polyvinyl chloride resin (B) is 600-1100 and greater than that of tetrahydrofuran-soluble portion of the polyvinyl chloride resin (A) which is 400-1000, and wherein said film is delustered and thermally shrinkable.

2. A film according to claim 1 wherein Component (A) has a tetrahydrofuran-insoluble gel content of 15-25 wt. %.

3. A film according to claim 1 wherein the tetrahydrofuan-soluble portion of Component (A) has an average degree of polymerization of 500-800.

4. A film according to claim 1 wherein the tetrahydrofuran-soluble portion of Component (B) has an average degree of polymerization of 700-900.

5. A film according to claim 1 wherein the resin mixture has tetrahydrofuran-insoluble gel content of 7-15 wt % based on Components (A) plus (B).

6. A film according to claim 1 wherein the film is oriented to an orientation ratio in at least one direction of 2.3-4.0.

7. A film according to claim 1 wherein Component (A) has a tetrahydrofuran-insoluble gel content of 15-25 wt. %; wherein Component (B) and the tetrahydrofuran-soluble portion of Component (A) have an average degree of polymerization of 500-800; wherein the resin mixture has tetrahydrofuran-insoluble gel content of 7-17 wt. % based on Components (A) plus (B); and wherein the film is oriented to an orientation ratio in at least one direction of 2.3-4.0.

8. A film according to claim 1 wherein the average polymerization degree of tetrahydrofuran-soluble portion of Component (B) is greater than that of tetrahydrofuran-soluble portion of Component (A) by at least 100.

9. A film according to claim 1 wherein the average polymerization degree of tetrahydrofuran-soluble portion of Component (B) is greater than that of tetrahydrofuran-soluble portion of Component (A) by at least 200.

10. A film according to claim 1, wherein the average polymerization degree of tetrahydrofuran soluble portion of the partially crosslinked polyvinyl chloride resin (A) is 600–800.

11. A film of claim 1, wherein said crosslinked polyvinyl chloride resin (A) is crosslinked by reaction with the two ethylenic double bonds in a multi-functional monomer having at least two ethylenic double bonds.

12. A film of claim 11, wherein said monomer is a dialkyl ester of a phthalic acid or an ethylenically unsaturated dibasic acid, a divinyl ether, or a diacrylic or dimethacrylic ester of a polyatomic alcohol.

13. A method of forming a delustered, thermally shrinkable film comprising extruding and orienting a mixture of (A) a partially crosslinked polyvinyl chloride resin having a tetrahydrofuran-insoluble gel content of 10–35 wt. %, (B) a non-crosslinked polyvinyl chloride resin, and (C) 0 to 20 parts by weight of a plasticizer per 100 parts by weight of (A) plus (B), said mixture being mixed in an (A):(B) weight ratio of from 30:70 to 60:40, in which the average polymerization degree of tetrahydrofuran-soluble portion of the polyvinyl chloride resin (B) is 600–1100 and greater than that of tetrahydrofuran-soluble portion of the polyvinyl chloride resin (A) which is 400–1000, whereby there is formed a delustered and thermally shrinkable film.

* * * * *